US010684440B2

(12) United States Patent
Jin et al.

(10) Patent No.: US 10,684,440 B2
(45) Date of Patent: Jun. 16, 2020

(54) SYSTEM AND METHOD FOR MOUNTING AND ALIGNING DIFFERENT SIZE OPTICAL COMPONENTS USING LINKED-RAIL MOUNTING

(71) Applicant: NEWPORT CORPORATION, Irvine, CA (US)

(72) Inventors: Wen Xu Jin, Irvine, CA (US); Richard Sebastian, Irvine, CA (US)

(73) Assignee: Newport Corporation, Irvine, CA (US)

( * ) Notice: Subject to any disclaimer, the term of this patent is extended or adjusted under 35 U.S.C. 154(b) by 224 days.

(21) Appl. No.: 15/940,924

(22) Filed: Mar. 29, 2018

(65) Prior Publication Data

US 2018/0217347 A1 Aug. 2, 2018

Related U.S. Application Data

(62) Division of application No. 14/582,925, filed on Dec. 24, 2014, now Pat. No. 9,964,728.

(51) Int. Cl.
*G02B 7/00* (2006.01)
*G02B 13/16* (2006.01)
(Continued)

(52) U.S. Cl.
CPC ............. *G02B 7/003* (2013.01); *G02B 7/004* (2013.01); *G02B 13/16* (2013.01); *G02B 27/106* (2013.01); *G02B 27/126* (2013.01)

(58) Field of Classification Search
CPC .......... G02B 7/00; G02B 7/003; G02B 7/004; G02B 7/005; G02B 7/02; G02B 7/021;
(Continued)

(56) References Cited

U.S. PATENT DOCUMENTS 5,035,333 A * 7/1991 Klingner ................ G01M 11/04 211/189
5,039,043 A * 8/1991 Hodge ...................... B01L 9/00 248/125.8

(Continued)

FOREIGN PATENT DOCUMENTS

DE 202008008703 10/2008
WO WO2004006212 1/2004

OTHER PUBLICATIONS

Thorlabs, Inc. Removable segment cage plate, CAD drawing (Feb. 8, 2011).

(Continued)

*Primary Examiner* — Joshua E Rodden
(74) *Attorney, Agent, or Firm* — George Fountain; Loza & Loza LLP

(57) ABSTRACT

The disclosure relates to an apparatus for mounting optical components in a manner that self-aligns the optical axes of the optical components. The apparatus uses an optical component mount that includes a housing consisting of a single rail mount configured to mechanically couple to a portion of a rail for supporting the optical component mount on a rail. The housing also has an optical component dock configured to support an optical component in a manner that defines an optical axis. The rail mount and the optical component dock are configured to make the optical axis substantially parallel with a longitudinal axis of the rail. Using such optical component mounts secured to the rail would result in the self-alignment of the optical axes of optical components on the optical component mounts. Various embodiments of such apparatus are also provided in the disclosure.

20 Claims, 7 Drawing Sheets

300 320a 320b 320c 320d 322a 322b 322c 322d 324a 324b 324c 324d 326a 326b 326c 326d 328a 328b 328c 328d 330a 330b 330c 330d 332a 332b 332c 332d 310a 310b 310c 310d 312a 312b 312c 312d 360a 360b 360c 362a 362b 362c 364a 364b 364c 366a 366b 366c 368a 368b 368c 370a 370b 370c 372a 372b 372c 374a 374b 374c

(51) Int. Cl.
*G02B 27/10* (2006.01)
*G02B 27/12* (2006.01)

(58) Field of Classification Search
CPC .......... G02B 7/023; G02B 7/10; G02B 7/102; G02B 7/105; G02B 13/02; G02B 13/16; G02B 27/106; G02B 27/126
USPC ........ 211/13.1; 248/512, 514; 359/819, 821, 359/822, 823, 826
See application file for complete search history.

(56) References Cited

U.S. PATENT DOCUMENTS 5,140,470 A * 8/1992 Luecke .................. G02B 7/004 359/818
5,597,149 A * 1/1997 Hodge ................. G01B 5/0004 248/231.41
5,748,390 A * 5/1998 Koiwai .................... G02B 7/08 359/811
5,828,502 A * 10/1998 Afshari .................. G01M 11/04 359/819
5,852,519 A * 12/1998 Do ........................... G02B 7/00 359/822
6,393,645 B1 * 5/2002 Kadinger ................. A46B 3/18 15/104.04
6,399,026 B1 6/2002 Karrai
9,425,711 B2 * 8/2016 Li .......................... H02N 2/006
2007/0065086 A1 * 3/2007 Wyatt .................... G02B 7/004 385/137
2009/0266967 A1 * 10/2009 Allen ..................... G01M 11/04 248/512

OTHER PUBLICATIONS

Thorlabs, Inc. Compact cage plate, CAD drawing (Oct. 19, 2006).
PCT/US2014/041397. Applicant: Newport Corporation. Int'l Search Report & Written Opinion (dated Nov. 6, 2014).

* cited by examiner

SYSTEM AND METHOD FOR MOUNTING AND ALIGNING DIFFERENT SIZE OPTICAL COMPONENTS USING LINKED-RAIL MOUNTING

CROSS-REFERENCE TO A RELATED APPLICATION

This application is a divisional of U.S. patent application Ser. No. 14/582,925, filed on Dec. 24, 2014, which is incorporated herein by reference.

FIELD

This disclosure relates generally to optical systems, and in particular, to a system and method for mounting and aligning optical components using single-rail mounting.

BACKGROUND

Optical measurement systems are typically employed to measure certain properties or characteristics of one or more specimens. In implementing such measurements, optical measurement systems employ various optical components arranged in a particular manner in order to effectuate the intended measurement on the one or more specimens. Such optical components include, but are not limited to, light sources, filters, lenses, mirrors, spatial filters, modulators, choppers, collimators, detectors, diffusers, fiber optics, prisms, and others.

Optical components of such an optical measurement system are typically mounted on an optical table using various types of fixed mounts. Such fixed optical component mounts are secured to separate posts that are, in turn, secured to an optical table. With individual components being on separate posts, optical alignment typically requires significant effort to properly adjust the position and orientation of each individual mount. For instance, considerable effort is often made to properly orient each optical component so that its optic surface faces an incoming beam substantially perpendicular. Further, substantial effort is often employed in aligning optical components concentric with each other (e.g., so that their optical axes are substantially aligned).

In many systems, optical alignment is often performed with a live beam. This method of optical system setup entails relying on a live beam spot image to properly align the optics of the system. Again, such alignment method involves considerable effort, typically repeated, and time consuming to properly position and orient optical components so that their optical surfaces are substantially perpendicular to the incoming beam and concentric with each other.

SUMMARY

An aspect of the disclosure relates to an apparatus for mounting at least a group of optical components in a manner that self-aligns the optical axes of the optical components without requiring alignment by live light beam.

In particular, the apparatus comprises a rail and a first optical component mount. The first optical component mount comprises a first housing consisting of a first rail mount mechanically coupled to a portion of the rail for supporting the first optical component mount on the rail. The first housing further comprises a first optical component dock configured to support a first optical component in a manner that defines a first optical axis. The first rail mount and the first optical component dock are configured such that the first optical axis is substantially parallel with a longitudinal axis of the rail.

In another aspect, the rail may be configured to have a "D" shaped cross-section. That is, a portion of the cross-section of the rail may be semicircular, and another portion thereof may be flat. The cross-section may be uniform throughout its longitudinal axis. The "D" shaped rail assists in the alignment of the optical axes of the optical component mounts mounted on the rail.

In another aspect, the first optical component dock is configured as a cylindrical hole, wherein a longitudinal axis of the cylindrical hole substantially aligns with the first optical axis. In still another aspect, the first rail mount comprises a hole formed within the first housing. In yet another aspect, the first optical component mount further comprises a locking mechanism for securely locking the rail onto the first rail mount. In a further aspect, the locking mechanism comprises a threaded screw positioned within a threaded hole within the first housing, wherein the threaded screw includes a flat end surface is configured to contact the flat surface of the rail to urge the portion of the rail against the first housing within the hole to securely lock the rail onto the first rail mount. This results in the proper alignment of the optical axes and orientations of all the optical components mounted on the rail via the optical component mounts.

In another aspect, the apparatus further comprises a second optical component mount including a second housing consisting of a second rail mount mechanically coupled to another portion of the rail for supporting the second optical component mount on the rail. The second housing further comprising a second optical component dock configured to support a second optical component in a manner that defines a second optical axis. The second rail mount and the second optical component dock are configured such that the second optical axis substantially aligns with the first optical axis.

In another aspect, the apparatus further comprises a base configured to be attached to an optical table; and a telescopic assembly comprising a bore mounted substantially vertically on the base, a telescopic mount configured to slide vertically along and rotate angularly around a longitudinal axis of the bore, the first optical component mount being supported by the telescopic mount, and a locking mechanism configured to lock the telescopic mount within the bore at a vertical position and angular orientation as desired by a user.

Another aspect of the disclosure relates to an apparatus for mounting optical components in a manner that non-parallel optical axes from different optical components substantially aligns with a set of optical axes of a junction optical component.

In particular, the apparatus comprises a first rail and a second rail. The apparatus further includes a first optical component mount comprising a first housing consisting of a first rail mount mechanically coupled to a first portion of the first rail for supporting the first optical component mount on the first rail. The first housing further comprising a first optical component dock configured to support a first optical component in a manner that defines a first optical axis. The first rail mount and the first optical component dock are configured such that the first optical axis is substantially parallel with a first longitudinal axis of the first rail.

The apparatus further comprises a second optical component mount comprising a second housing consisting of a second rail mount mechanically coupled to a first portion of the second rail for supporting the second optical component mount on the second rail. The second housing further comprising a second optical component dock configured to support a second optical component in a manner that defines a second optical axis. The second rail mount and the second optical component dock are configured such that the second optical axis is substantially parallel with a second longitudinal axis of the second rail.

The apparatus further comprises a junction optical component mount mechanically coupled to a second portion of the first rail and a second portion of the second rail, wherein the junction optical component mount is configured to support a junction optical component in a manner that defines a set of optical axes, wherein the first and second optical axes substantially aligns with the optical axes of the set, respectively.

In another aspect, the apparatus comprises a third optical component mount including a third housing consisting of a third rail mount mechanically coupled to a third portion of the first rail for supporting the third optical component mount on the first rail, the third housing further comprising a third optical component dock configured to support a third optical component in a manner that defines a third optical axis, wherein the third rail mount and the third optical component dock are configured such that the third optical axis substantially aligns with one of the optical axes of the set.

In another aspect, the apparatus further comprises a third rail including a first portion mechanically coupled to the junction optical component mount; and a third optical component mount including a third housing consisting of a third rail mount mechanically coupled to a second portion of the third rail for supporting the third optical component mount on the third rail. The third housing further comprises a third optical component dock configured to support a third optical component in a manner that defines a third optical axis, wherein the third optical axis substantially aligns with one of the optical axes of the set.

In another aspect, the apparatus further comprises a third optical component mount including a third housing consisting of a third rail mount mechanically coupled to a third portion of the first rail for supporting the third optical component mount on the first rail. The third housing further comprising a third optical component dock configured to support a third optical component in a manner that defines a third optical axis. The third rail mount and the third optical component dock are configured such that the third optical axis substantially aligns with one of the optical axes of the set.

The apparatus further comprises a third rail including a first portion mechanically coupled to the junction optical component mount; and a fourth optical component mount including a fourth housing consisting of a fourth rail mount mechanically coupled to a second portion of the third rail for supporting the fourth optical component mount on the third rail. The fourth housing further comprises a fourth optical component dock configured to support a fourth optical component in a manner that defines a fourth optical axis, wherein the fourth optical axis substantially aligns with another one of the optical axes of the set.

In another aspect, the apparatus further comprises a base configured to be attached to an optical table; and a telescopic assembly including a bore mounted substantially vertical on the base, a telescopic mount configured to slide vertically along and rotate angularly around a longitudinal axis of the bore, wherein the junction optical component mount is mounted on the telescopic mount, and a locking mechanism configured to lock the telescopic mount within the bore at a vertical position and angular orientation as desired by a user.

Another aspect of the disclosure relates to an apparatus for mounting optical components of different sizes or diameters in a manner that self-aligns the optical axes of the optical components.

In particular, the apparatus comprises a first rail and a second rail. The apparatus further comprises a first optical component mount comprising a first housing consisting of a first rail mount mechanically coupled to a first portion of the first rail for supporting the first optical component mount on the first rail. The first housing further comprising a first optical component dock configured to support a first optical component in a manner that defines a first optical axis. The first rail mount and the first optical component dock are configured such that the first optical axis is substantially parallel with a first longitudinal axis of the first rail.

Additionally, the apparatus comprises a second optical component mount comprising a second housing consisting of a second rail mount mechanically coupled to a first portion of the second rail for supporting the second optical component mount on the second rail. The second housing further comprising a second optical component dock configured to support a second optical component in a manner that defines a second optical axis. The second rail mount and the second optical component dock are configured such that the second optical axis is substantially parallel with a second longitudinal axis of the second rail, wherein the first and second longitudinal axes are substantially parallel and spaced apart from each other.

Further, the apparatus comprises a link block including a third housing comprising a third rail mount mechanically coupled to a second portion of the first rail, and a fourth rail mount mechanically coupled to a second portion of the second rail. The third and fourth rail mounts are configured to substantially align the second optical axis with the first optical axis.

In another aspect, the first optical component mount dock comprises a first cylindrical hole through the first housing, and the second optical component dock comprises a second cylindrical hole through the second housing, wherein a first diameter of the first cylindrical hole is greater than a second diameter of the second cylindrical hole. In other aspects, the third rail mount of the link block comprises a hole, and the fourth rail mount comprises a groove.

Other aspects, advantages and novel features of the disclosure will become apparent from the following detailed description of the invention when considered in conjunction with the accompanying drawings.

DETAILED DESCRIPTION OF THE EXEMPLARY EMBODIMENTS

Figure 1A:
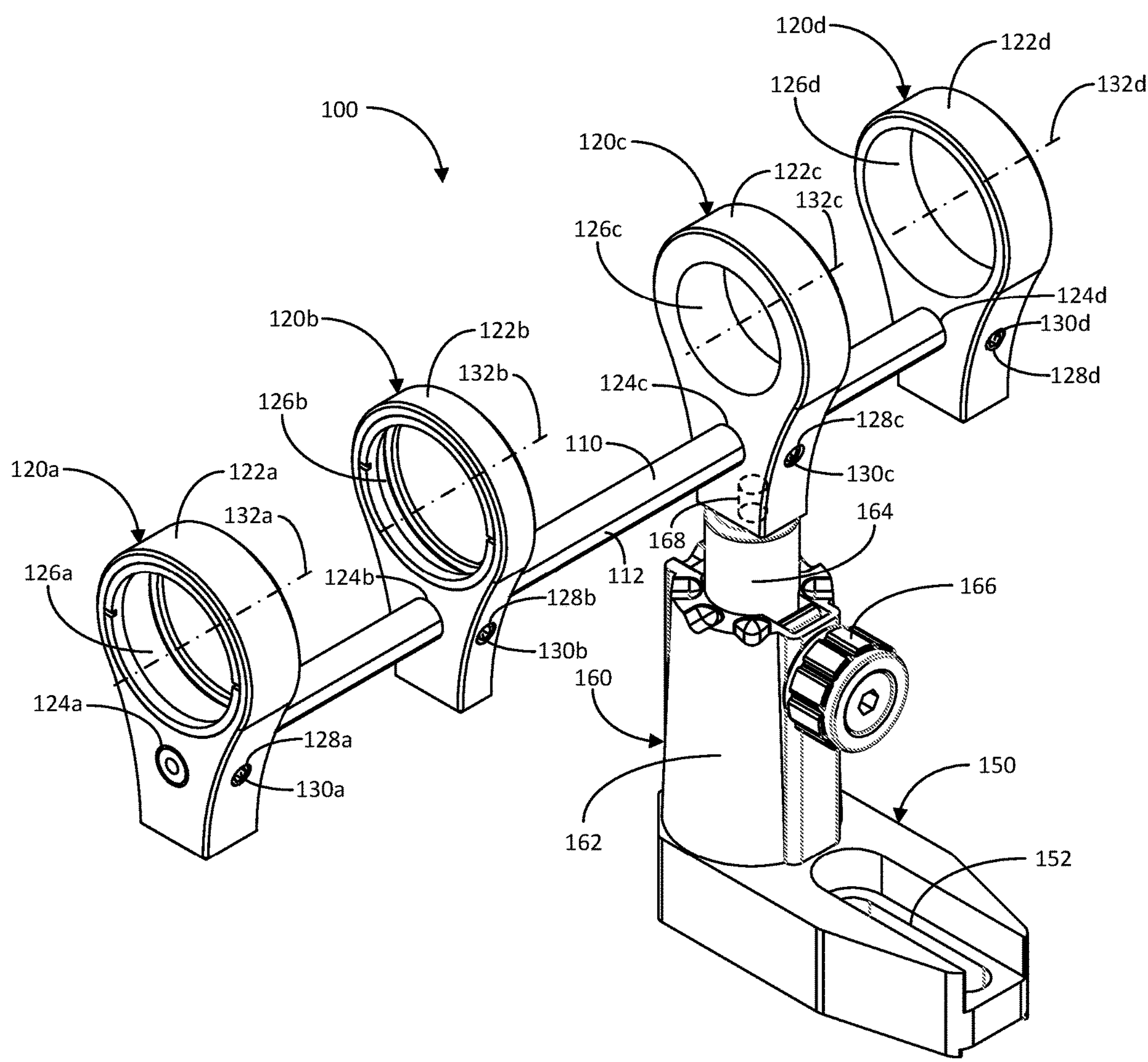
FIG. 1A illustrates a perspective view of an exemplary apparatus for mounting and aligning optical components in accordance with an aspect of the disclosure.

FIG. 1A illustrates a perspective view of an exemplary apparatus 100 for mounting and aligning optical components in accordance with an aspect of the disclosure. In summary, the apparatus 100 comprises a plurality of optical component mounts to which a plurality of optical components may be mounted, respectively. The optical component mounts are secured onto a single rail. The securing of the optical component mounts onto the single rail ensures that the optical axes of the optical components are substantially aligned. That is, the alignment of the optical axes may entail the optical components being substantially concentric with each other, and/or the optical surface of each of the components being substantially perpendicular to the transmitted or received light beam.

More specifically, the apparatus 100 comprises a plurality of optical component mounts 120*a*, 120*b*, 120*c*, and 120*d*. Although in this example, the apparatus 100 comprises four (4) optical component mounts, it shall be understood that the apparatus may have any number of optical component mount(s). The apparatus 100 further comprises a single rail 110 to which the optical components mounts are securely mounted. In this example, the rail 110 has a semi-circular cross-section with a flat surface 112. As discussed further herein, the flat surface 112 is used in connection with a locking mechanism to secure the optical component mounts 120*a*, 120*b*, 120*c*, and 120*d* on the rail 110. However, it shall be understood that that the rail 110 may be configured with a cross-section of any shape.

More specifically, each optical component mount (120*a*, 120*b*, 120*c*, and 120*d*) comprises a housing (122*a*, 122*b*, 122*c*, and 122*d*) that consists of a single rail mount (124*a*, 124*b*, 124*c*, and 124*d*) mechanically coupled to a portion of the rail 110 for supporting the optical component mount on the rail. In the exemplary embodiment, the rail mount (124*a*, 124*b*, 124*c*, and 124*d*) is configured as a hole through the housing (122*a*, 122*b*, 122*c*, and 122*d*). It shall be understood that the rail mount may be configured in many different manners.

Each optical component mount (120*a*, 120*b*, 120*c*, and 120*d*) includes a locking mechanism (128*a*/130*a*, 128*b*/130*b*, 128*c*/130*c*, and 128*d*/130*d*) for securely locking the rail 110 to the rail mount (124*a*, 124*b*, 124*c*, and 124*d*). In the exemplary embodiment, the locking mechanism comprises a countersink threaded hole (128*a*, 128*b*, 128*c*, and 128*d*) extending from a side wall of the housing (122*a*, 122*b*, 122*c*, and 122*d*) to the hole (124*a*, 124*b*, 124*c*, and 124*d*). Further, in accordance with the exemplary embodiment, the locking mechanism comprises a lock screw (130*a*, 130*b*, 130*c*, and 130*d*) threaded into the countersink hole (128*a*, 128*b*, 128*c*, and 128*d*). As discussed in more detail further herein, the tail end of the locking screw (130*a*, 130*b*, 130*c*, and 130*d*) makes contact with the flat surface 112 to urge the rail 110 against the internal wall of the hole (124*a*, 124*b*, 124*c*, and 124*d*) to effectuate the secure mounting of the optical component mount (120*a*, 120*b*, 120*c*, and 120*d*) to the rail 110.

Each of the housing (122*a*, 122*b*, 122*c*, and 122*d*) of the optical component mounts (120*a*, 120*b*, 120*c*, and 120*d*) further includes an optical component dock (126*a*, 126*b*, 126*c*, and 126*d*). Each of the optical component dock (126*a*, 126*b*, 126*c*, and 126*d*) is configured to securely and coaxially receive an optical component (not shown in FIG. 1A) in a manner that defines an optical axis (132*a*, 132*b*, 132*c*, and 132*d*) substantially parallel with a longitudinal axis of the rail 110. In this example, each of the optical component dock (126*a*, 126*b*, 126*c*, and 126*d*) is configured as a threaded hole for mating with external threads of a corresponding optical component. It shall be understood that the optical component dock may be configured in different manners for securely receiving an optical component.

The distance and position of the center of the thru-hole (124*a*, 124*b*, 124*c*, and 124*d*) with respect to the center of the optical component dock (126*a*, 126*b*, 126*c*, and 126*d*) are accurately controlled to ensure that the optical axes (132*a*, 132*b*, 132*c*, and 132*d*) of the optical components mounted on the mounts (120*a*, 120*b*, 120*c*, and 120*d*) are substantially aligned (i.e., substantially collinear). This ensures that the optical components are substantially concentric with each other, and that the optical surface of each of the components is substantially perpendicular to the propagating light beam. The locking screws (130*a*, 130*b*, 130*c*, and 130*d*), whose ends contact the flat portion 112 of the single rail 110 via the countersink holes (128*a*, 128*b*, 128*c*, and 128*d*) ensure that the position of the optical component mounts (120*a*, 120*b*, 120*c*, and 120*d*) with respect to the single rail 110 is secured and locked.

The apparatus 100 further comprises a base 150 for mounting the apparatus on an optical table (not shown). In this regards, the base 150 may comprise a slot 152 to receive one or more threaded screws for securing the base onto the optical table.

Additionally, the apparatus 100 further comprises a telescopic assembly 160 securely mounted on the base 150. The telescopic assembly 160 includes a bore 162 through which a telescopic mount 164 extends and slides coaxially along a longitudinal axis of the bore. The telescopic mount 164 is further configured to rotate coaxially within the bore 162. The telescopic assembly 160 further comprises a locking knob 166 for locking the telescopic mount 164 within the bore 162 in a desired vertical and angular position. The telescopic mount 164 further includes a mounting post 168 extending vertically and coaxially above the telescopic mount. The mounting post 168 is configured to be received through another hole at a bottom side of optical component mount 120*c*, in this example. A user may adjust the vertical and angular position of the telescopic mount 164 within the bore 162 to vertically and angularly position the optical component mounts 120*a*, 120*b*, 120*c*, and 120*d* as desired.

Figure 1B:
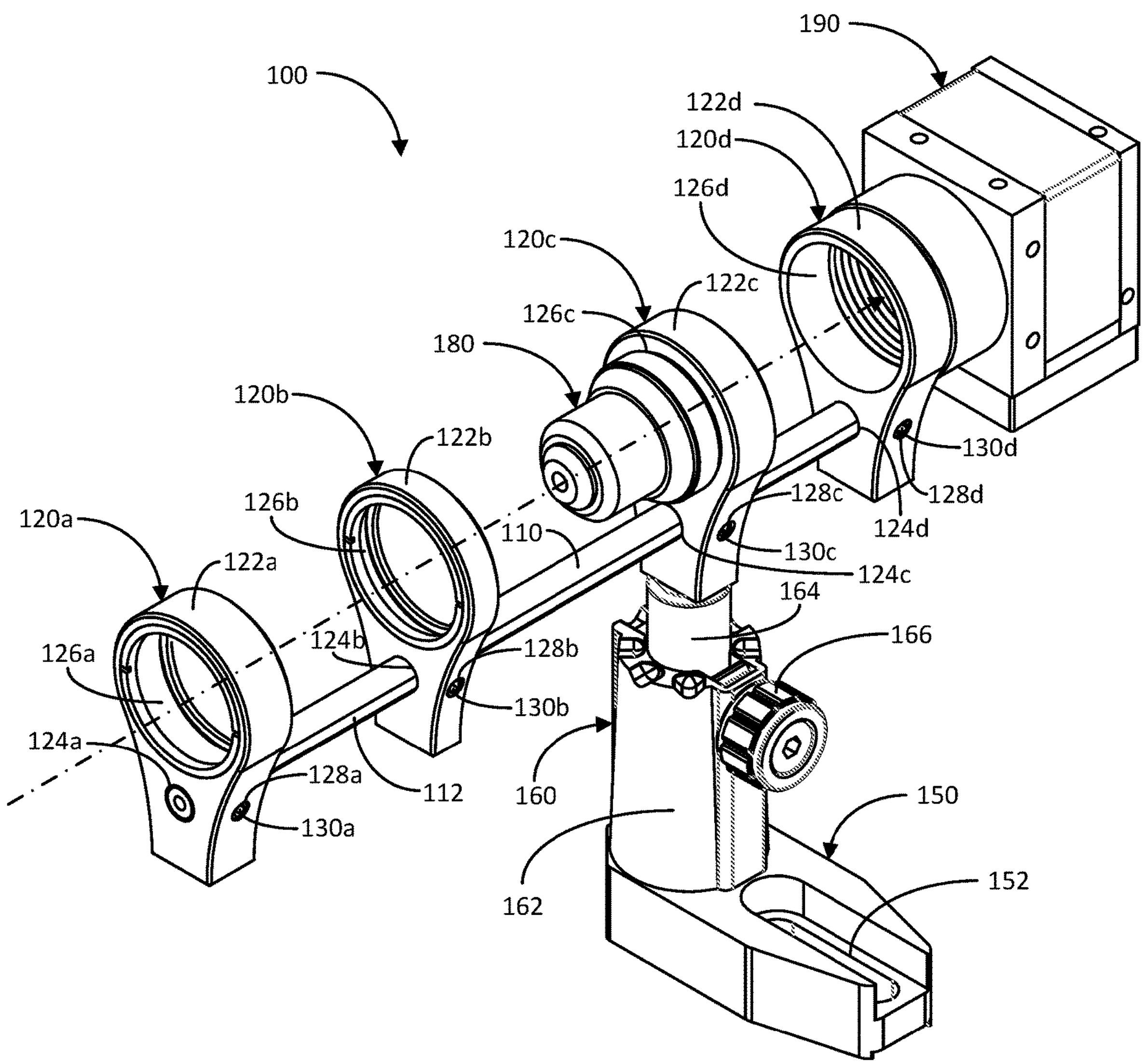
FIG. 1B illustrates a perspective view of the exemplary apparatus of FIG. 1A, but further including optical components mounted thereon in accordance with another aspect of the disclosure.

FIG. 1B illustrates a perspective view of the exemplary apparatus 100 including a couple of optical components mounted thereon in accordance with another aspect of the disclosure. In this example, the apparatus 100 further comprises a lens 180 securely and coaxially mounted in the optical component dock 126*c* of optical component mount 120*c*. Additionally, in this example, the apparatus 100 comprises a camera 190 securely and coaxially mounted in the optical component dock 126*d* of optical component mount 120*d*. Although in this example, the lens 180 and camera 190 are examples of optical components that may be mounted to the apparatus 100, it shall be understood that other types of optical components may be mounted to the apparatus as well.

Because the optical component mounts 120*c* and 120*d* are secured onto the common single rail 110, and the distance and position of the centers of the thru-holes 124*c* and 124*d* with respect to the centers of the optical component docks 126*c* and 126*d* are accurately controlled, the light beam (shown as an alternating dash-dot arrow line) propagates substantially through the optical axes 132*c* and 132*d* of the lens 180 and camera 190. Again, this ensures proper optical alignment between the components 180 and 190 to ensure accurate and precise optical processing, detection and measurement.

Figure 2A:
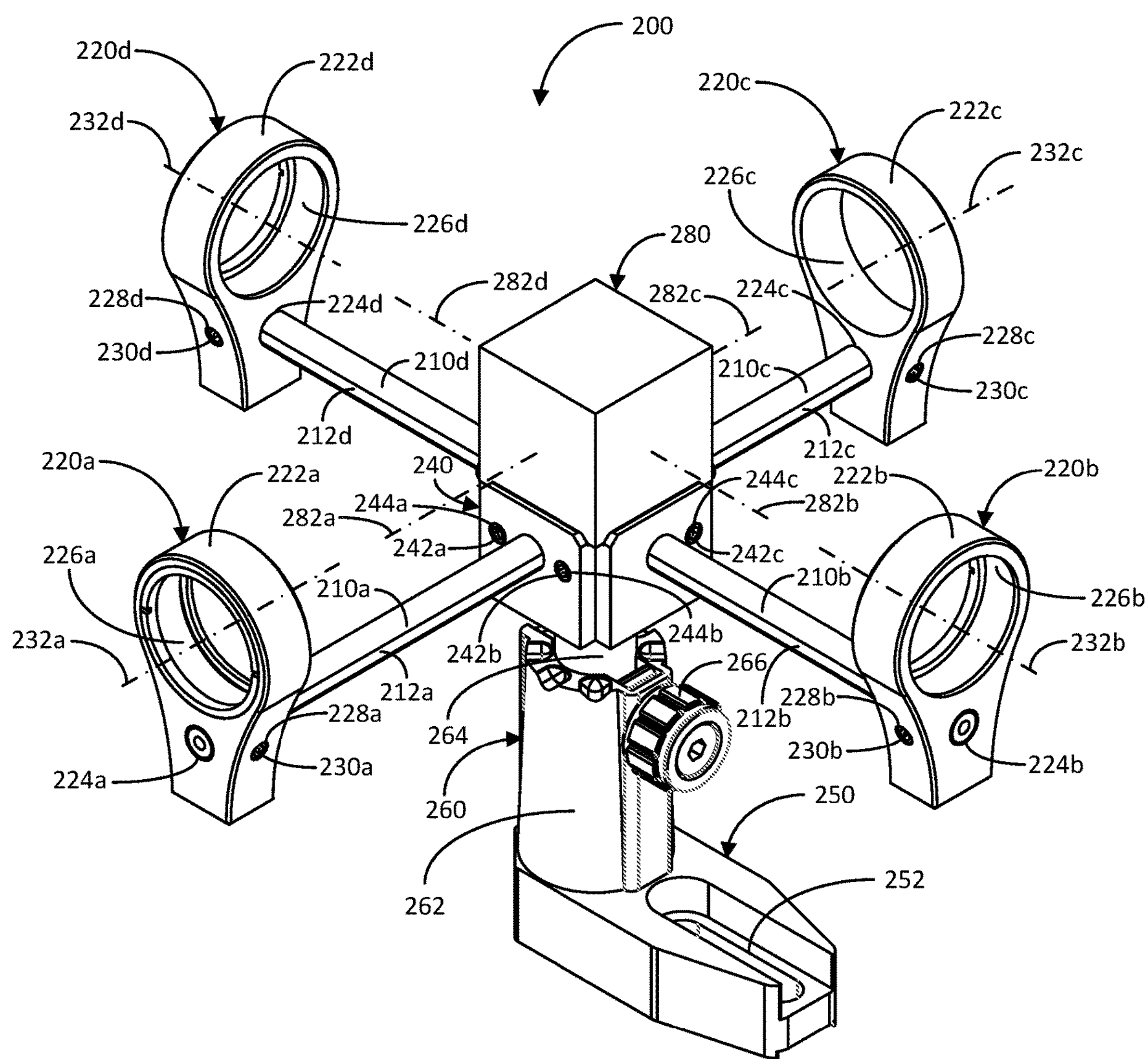
FIG. 2A illustrates a perspective view of another exemplary apparatus for mounting and aligning optical components with respect to a junction optical component in accordance with another aspect of the disclosure.

FIG. 2A illustrates a perspective view of another exemplary apparatus 200 that includes at least one optical component (a "junction optical component," hereinafter) configured to transmit and/or receive light beams to and from different directions. In summary, the apparatus 200 comprises optical component mounts mounted respectively onto a plurality of rails or rail sections that intersect at the junction optical component. As some examples, junction optical component may be configured to split a light beam, combine light beams, change light beam direction, or transmit light beams in different directions.

More specifically, the apparatus 200 comprises a plurality of optical component mounts 220*a*, 220*b*, 220*c*, and 220*d* similar to optical component mounts 120*a*, 120*b*, 120*c*, and 120*d* of apparatus 100, previously discussed. That is, each optical component mount (220*a*, 220*b*, 220*c*, and 220*d*) comprises a housing (222*a*, 222*b*, 222*c*, and 222*d*) that consists of a single rail mount (224*a*, 224*b*, 224*c*, and 124*d*) (e.g., a thru-hole) mechanically coupled to a portion of a rail or rail section (210*a*, 210*b*, 210*c*, and 210*d*).

In this example, each rail or rail section (210*a*, 210*b*, 210*c*, and 210*d*) has a semi-circular cross-section with a flat surface (212*a*, 212*b*, 212*c*, and 212*d*). Similar to the previous embodiment, the flat surface (212*a*, 212*b*, 212*c*, and 212*d*) is used in connection with a locking mechanism to secure the optical component mount (220*a*, 220*b*, 220*c*, and 220*d*) to the rail or rail section (210*a*, 210*b*, 210*c*, and 210*d*). However, it shall be understood that that the rail (210*a*, 210*b*, 210*c*, and 210*d*) may be configured with a cross-section of any shape.

Each optical component mount (222*a*, 222*b*, 222*c*, and 222*d*) includes a locking mechanism (228*a*/230*a*, 228*b*/230*b*, 228*c*/230*c*, and 228*d*/230*d*) for securely locking the rail or rail section (210*a*, 210*b*, 210*c*, and 210*d*) to the rail mount (224*a*, 224*b*, 224*c*, and 224*d*). In the exemplary embodiment, the locking mechanism comprises a countersink threaded hole (228*a*, 228*b*, 228*c*, and 228*d*) extending from a side wall of the housing (222*a*, 222*b*, 222*c*, and 222*d*) to the hole (224*a*, 224*b*, 224*c*, and 224*d*). Further, in accordance with the exemplary embodiment, the locking mechanism comprises a lock screw (230*a*, 230*b*, 230*c*, and 230*d*) threaded into the countersink hole (228*a*, 228*b*, 228*c*, and 228*d*). As discussed in more detail further herein, the tail end of the locking screw (230*a*, 230*b*, 230*c*, and 230*d*) makes contact with the flat surface (212*a*, 212*b*, 212*c*, and 212*d*) to urge the rail or rail section (210*a*, 210*b*, 210*c*, and 210*d*) against the internal wall of the hole (224*a*, 224*b*, 224*c*, and 224*d*) to effectuate the secure mounting of the optical component mount (220*a*, 220*b*, 220*c*, and 220*d*) to the rail or rail section (210*a*, 210*b*, 210*c*, and 210*d*).

Each of the housing (222*a*, 222*b*, 222*c*, and 222*d*) of the optical component mounts (220*a*, 220*b*, 220*c*, and 220*d*) further includes an optical component dock (226*a*, 226*b*, 226*c*, and 226*d*). Each of the optical component dock (226*a*, 226*b*, 226*c*, and 226*d*) is configured to securely and coaxially receive an optical component (not shown) in a manner that defines an optical axis (232*a*, 232*b*, 232*c*, and 232*d*) substantially parallel with a longitudinal axis of the rail or rail section (210*a*, 210*b*, 210*c*, and 210*d*). In this example, each of the optical component dock (226*a*, 226*b*, 226*c*, and 226*d*) is configured as a threaded hole for mating with external threads of a corresponding optical component. It shall be understood that the optical component dock may be configured in different manners for securely receiving an optical component.

In apparatus 200, the rails or rail sections 210*a*, 210*b*, 210*c*, and 210*d* all intersect at a junction optical component mount 240 for a junction optical component 280. The junction optical mount 240 includes holes to receive respective portions the rails or rail sections 210*a*, 210*b*, 210*c*, and 210*d*, the holes being positioned to ensure substantial alignment (i.e., collinear) of a set of optical axes 282*a*, 282*b*, 282*c*, 282*d* of the junction optical component 280 with the optical axes 232*a*, 232*b*, 232*c*, 232*d* of the optical component mounts 220*a*, 220*b*, 220*c*, and 220*d*, respectively. Although in this example, the longitudinal axes of the rail or rail sections 210*a*, 210*b*, 210*c*, and 210*d* intersect each other at right angles (e.g., 90 degrees), it shall be understood that they may intersect each other at angles other than right angles.

The apparatus 200 further comprises a base 250 for mounting the apparatus on an optical table (not shown). In this regards, the base 250 may comprise a slot 252 to receive one or more threaded screws for securing the base onto the optical table.

Additionally, the apparatus 200 further comprises a telescopic assembly 260 securely mounted on the base 260. The telescopic assembly 260 includes a bore 262 through which a telescopic mount 264 extends and slides coaxially along a longitudinal axis of the bore. The telescopic mount 264 is further configured to rotate coaxially within the bore 262. The telescopic assembly 260 further comprises a locking knob 266 for locking the telescopic mount 264 within the bore 262 in a desired vertical and angular position. The telescopic mount 264 further includes a mounting post (not shown, but similar to mounting post 168) extending vertically and coaxially above the telescopic mount. The mounting post is configured to be received through a bottom hole of the junction optical mount 240. A user may adjust the vertical and angular position of the telescopic mount 264 within the bore 262 to vertically and angularly position the optical component mounts 220*a*, 220*b*, 220*c*, and 220*d* and junction optical mount 240 as desired.

The junction optical component 280 may be configured to split a light beam, combine light beams, change light beam direction, transmit light beams in different directions, or perform other optic functions with respect to multiple direction light beams. As examples, the junction optical component 280 may be a prism configured to split incoming light beam received from an optical component mounted on optical component mount 220*a* and transmit the split light beams to optical components mounted on optical component mounts 220*b* and 220*c*, respectively. As another example, the junction optical component 280 may be an optical combiner configured to combine separate light beams from optical components mounted on optical component mounts 220*a* and 220*d*, and transmit the combined light beam to an optical component mounted on optical component mount 220*b*.

As other examples, the junction optical component 280 may be a mirror configured to receive a light beam from an optical component mounted on optical component mount 220*a*, and redirect the light beam to an optical component mounted on optical component mount 220*b*. As still another example, the junction optical component 280 may be a laser source including optics for generating multiple light beams and directing them to two or more optical components mounted on two or more of the optical component mounts 220*a*, 220*b*, 220*c*, and 220*d*. The junction optical component 280 may be other types of optical devices different than the aforementioned examples.

Figure 2B:
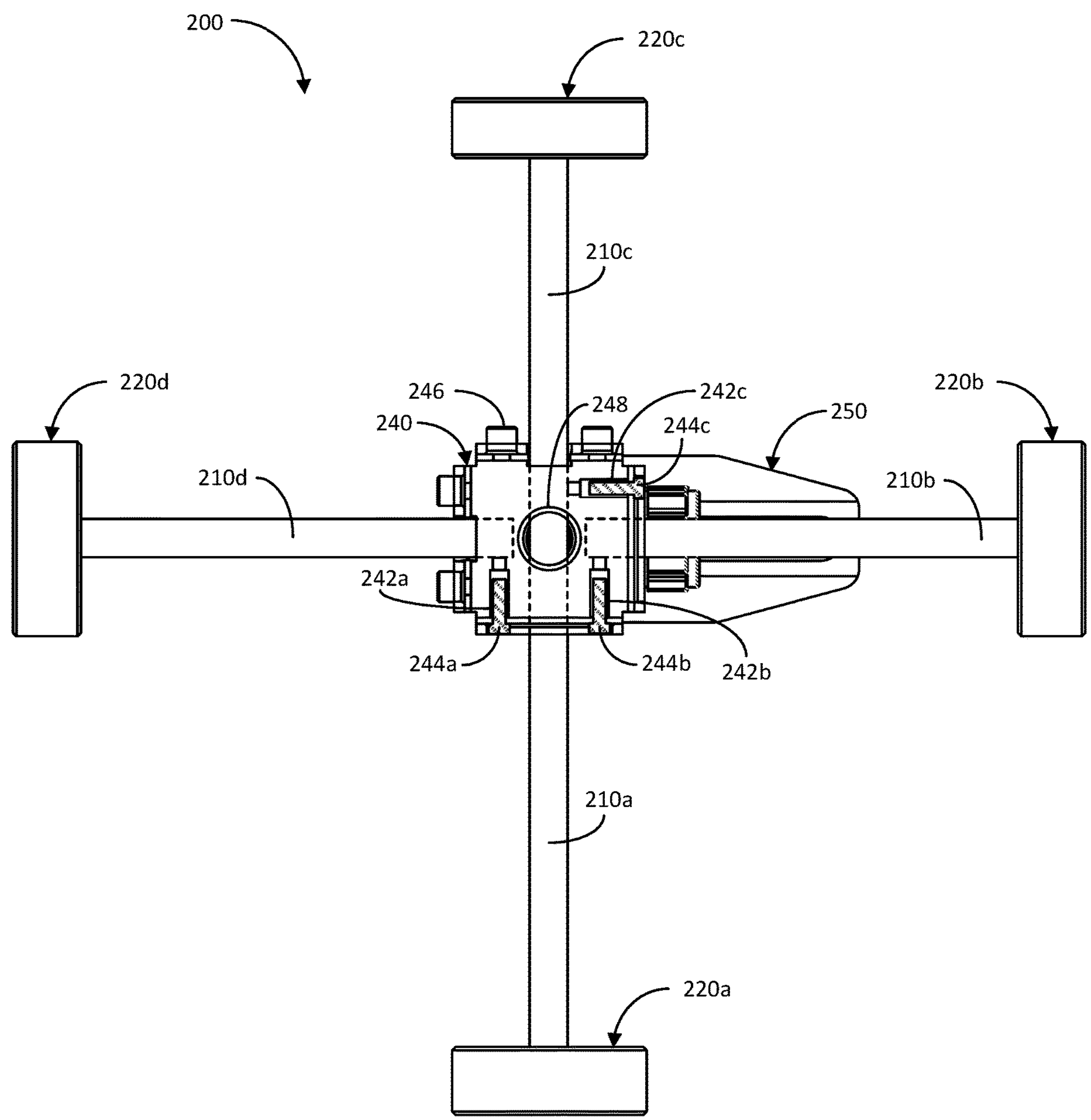
FIG. 2B illustrates a top view of the exemplary apparatus of FIG. 2A, without the junction optical component mounted thereon in accordance with another aspect of the disclosure.

FIG. 2B illustrates a top view of the apparatus 200 with the junction optical component 280 removed and the top wall of the junction optical component mount 240 partially transparent to illustrate internal components of the mount. As illustrated, the rail sections 210*a* and 210*c* are sections of a single rail; whereas, the rails 210*d* and 210*b* are separate from each other.

The junction optical component mount 240 includes a locking screw 244*a* mounted through a side of the mount and threaded into a bore 242*a* attached to the rail 210*d*. This secures the rail 210*d* onto the junction optical component mount 240. The junction optical component mount 240 also includes a locking screw 244*b* mounted through the side of the mount and threaded into a bore 242*b* attached to the rail 210*b*. This secures the rail 210*b* onto the junction optical component mount 240. Further, the junction optical component mount 240 includes a locking screw 244*c* mounted through another side of the mount and threaded into a bore 242*c* attached to the rail 210*b*/210*c*. This secures the rail 210*b*/210*c* onto the junction optical component mount 240.

Additionally, the junction optical component mount 240 comprises an alignment hole 248 to receive an alignment post (not shown) extending downward from a bottom of the junction optical component 280. In addition, the junction optical component mount 240 comprises a plurality of threaded screws 246 for securing the junction optical component 280 onto the mount 240.

Figure 3:
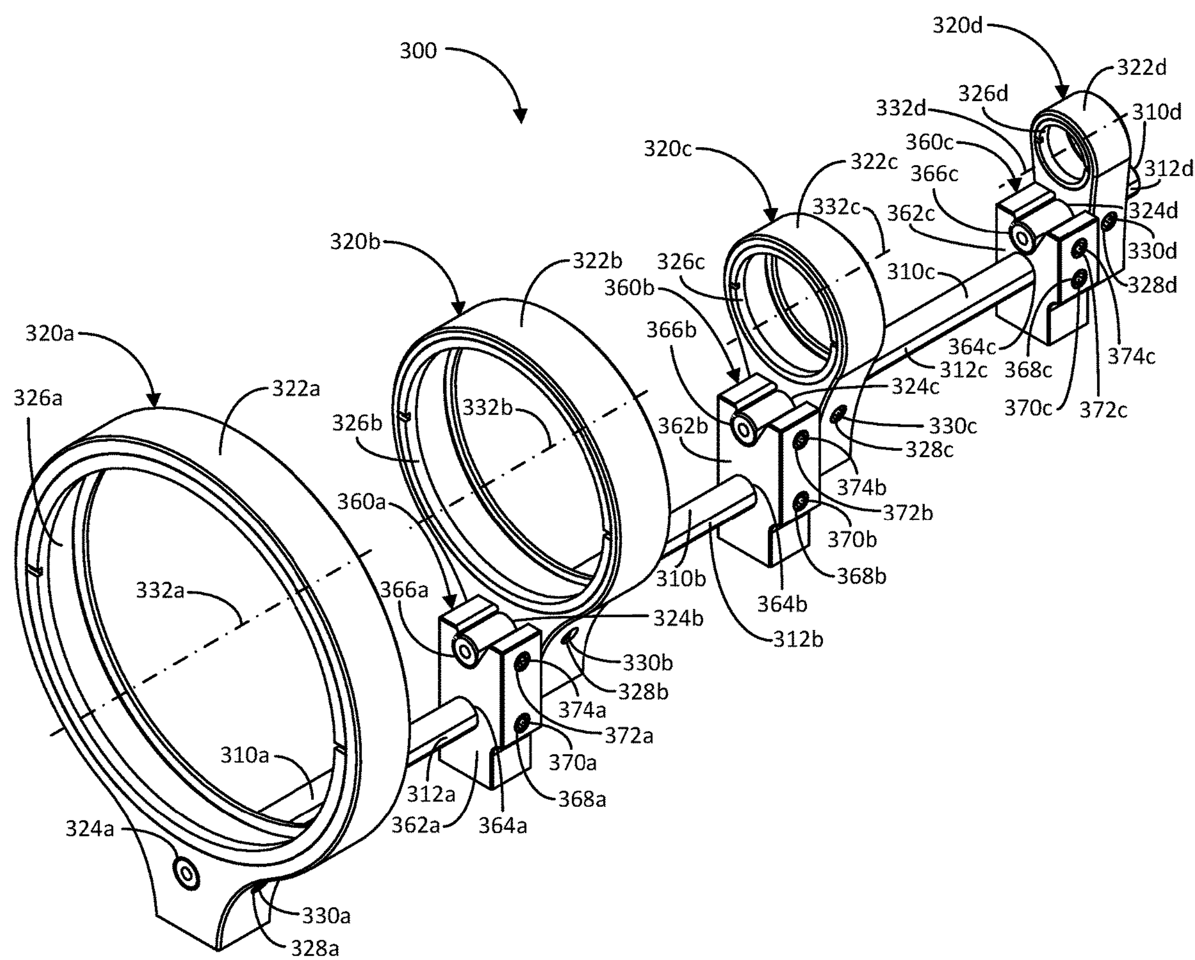
FIG. 3 illustrates a perspective view of another exemplary apparatus for mounting and aligning optical components in accordance with another aspect of the disclosure.

FIG. 3 illustrates a perspective view of another exemplary apparatus 300 for mounting and aligning optical components in accordance with another aspect of the disclosure. The apparatus 300 is similar to that of apparatus 100, except that the optical component mounts have docks of different diameters to accommodate differently-sized optical components. Additionally, the apparatus 300 includes link blocks and multiple rails in order to substantially align the optical axes of the different-size optical components.

In particular, the apparatus 300 comprises a plurality of optical component mounts 320*a*, 320*b*, 320*c*, and 320*d*. Although in this example, the apparatus 300 comprises four (4) optical component mounts, it shall be understood that the apparatus may have any number of optical component mount(s). The apparatus 300 further comprises rails 310*a*, 310*b*, 310*c*, and 310*d* to which the optical components mounts 320*a*, 320*b*, 320*c*, and 320*d* are securely mounted. In this example, each rail (310*a*, 310*b*, 310*c*, and 310*d*) has a semi-circular cross-section with a flat surface (312*a*, 312*b*, 312*c*, and 312*d*). As discussed further herein, each flat surface (312*a*, 312*b*, 312*c*, and 312*d*) is used in connection with a locking mechanism to secure the optical component mount (320*a*, 320*b*, 320*c*, and 320*d*) on the rail (310*a*, 310*b*, 310*c*, and 310*d*). However, it shall be understood that that the rail (310*a*, 310*b*, 310*c*, and 310*d*) may be configured with a cross-section of any shape.

More specifically, each optical component mount (320*a*, 320*b*, 320*c*, and 320*d*) comprises a housing (322*a*, 322*b*, 322*c*, and 322*d*) that consists of a single rail mount (324*a*, 324*b*, 324*c*, and 324*d*) mechanically coupled to a portion of the rail (310*a*, 310*b*, 310*c*, and 310*d*) for supporting the optical component mount on the rail. In the exemplary embodiment, the rail mount (324*a*, 324*b*, 324*c*, and 324*d*) is configured as a hole through the housing (322*a*, 322*b*, 322*c*, and 322*d*). It shall be understood that the rail mount may be configured in many different manners.

Each optical component mount (320*a*, 320*b*, 320*c*, and 320*d*) includes a locking mechanism (328*a*/330*a*, 328*b*/330*b*, 328*c*/330*c*, and 328*d*/330*d*) for securely locking the rail (310*a*, 310*b*, 310*c*, and 310*d*) to the rail mount (324*a*, 324*b*, 324*c*, and 324*d*). In the exemplary embodiment, the locking mechanism comprises a countersink threaded hole (328*a*, 328*b*, 328*c*, and 328*d*) extending from a side wall of the housing (322*a*, 322*b*, 322*c*, and 322*d*) to the hole (324*a*, 324*b*, 324*c*, and 324*d*). Further, in accordance with the exemplary embodiment, the locking mechanism comprises a lock screw (330*a*, 330*b*, 330*c*, and 330*d*) threaded into the countersink hole (328*a*, 328*b*, 328*c*, and 328*d*). As discussed in more detail further herein, the tail end of the locking screw (330*a*, 330*b*, 330*c*, and 330*d*) makes contact with the flat surface (312*a*, 312*b*, 312*c*, and 312*d*) to urge the rail (310*a*, 310*b*, 310*c*, and 310*d*) against the internal wall of the hole (324*a*, 324*b*, 324*c*, and 324*d*) to effectuate the secure mounting of the optical component mount (320*a*, 320*b*, 320*c*, and 320*d*) to the rail (310*a*, 310*b*, 310*c*, and 310*d*).

Each of the housing (322*a*, 322*b*, 322*c*, and 322*d*) of the optical component mounts (320*a*, 320*b*, 320*c*, and 320*d*) further includes an optical component dock (326*a*, 326*b*, 326*c*, and 326*d*). Each of the optical component dock (326*a*, 326*b*, 326*c*, and 326*d*) is configured to securely and coaxially receive an optical component (not shown) in a manner that defines an optical axis (332*a*, 332*b*, 332*c*, and 332*d*) substantially parallel with a longitudinal axis of the rail (310*a*, 310*b*, 310*c*, and 310*d*). In this example, each of the optical component dock (326*a*, 326*b*, 326*c*, and 326*d*) is configured as a threaded hole for mating with external threads of a corresponding optical component. It shall be understood that the optical component dock may be configured in different manners for securely receiving an optical component.

Further, in this example, the diameters of the optical component docks 326*a*, 326*b*, 326*c*, 326*d* are different to accommodate different-size optical components. For example, the diameter of optical component dock 326*b* is smaller than the diameter of optical component dock 326*a*; the diameter of optical component dock 326*c* is smaller than the diameter of optical component dock 326*b*; and the diameter of optical component dock 326*d* is smaller than the diameter of optical component dock 326*c*. It shall be understood that the apparatus 300 may combine optical component mounts with docks of different diameters in any manner as desired by a user.

In order to substantially align (i.e., collinear) the optical axes 332*a*, 332*b*, 332*c*, 332*d* associated with the optical component mounts 320*a*, 320*b*, 320*c*, 320*d*, the apparatus 300 further comprises a plurality of link blocks 360*a*, 360*b*, and 360*c*. The link block 360*a* comprises a housing 362*a* including a rail mount 364*a* (e.g., a thru-hole) mechanically coupled to a portion of the rail 310*a*; the other portion of the rail 310*a* being mechanically coupled to the rail mount 324*a* of optical component mount 320*a*. The housing 362*a* of the link block 360*a* also includes another rail mount 366*a* (e.g., a groove) mechanically coupled to a portion of the rail 310*b*; another portion of the rail 310*b* being mechanically coupled to the rail mount 324*b* of the optical component mount 320*b*. In this configuration, the link block 360*a* effectively raises the height of the optical component mount 320*b* such that its optical axis 332*b* substantially aligns with the optical axis 332*a* of optical component mount 320*a*.

The link block 360*a* further includes locking mechanisms 368*a*/370*a* and 372*a*/374*a* for securely locking the rails 310*a* and 310*b* to the link block 360*a*, respectively. The locking mechanisms comprise a countersink threaded holes 368*a* and 372*a* extending from a side wall of the housing 362*a* to the hole 364*a* and groove 366*a*, respectively. Further, in accordance with the exemplary embodiment, the locking mechanisms comprise lock screws 370*a* and 374*a* threaded into the countersink holes 368*a* and 372*a*, respectively. As discussed in more detail further herein, the tail ends of the locking screws 370*a* and 374*a* make contact with the flat surfaces 312*a* and 312*b* to urge the rails 310*a* and 310*b* against the respective internal walls of the hole 364*a* and groove 366*a* to effectuate the secure mounting of the link block 360*a* to the rails 310*a* and 310*b*, respectively.

Similarly, the link block 360*b* comprises a housing 362*b* including a rail mount 364*b* (e.g., a thru-hole) mechanically coupled to a portion of the rail 310*b*; the other portion of the rail 310*b* being mechanically coupled to the rail mount 324*b* of optical component mount 320*b*. The housing 362*b* of the link block 360*b* also includes another rail mount 366*b* (e.g., a groove) mechanically coupled to a portion of the rail 310*c*; another portion of the rail 310*c* being mechanically coupled to the rail mount 324*c* of the optical component mount 320*c*. In this configuration, the link block 360*b* effectively raises the height of the optical component mount 320*c* such that its optical axis 332*c* substantially aligns with the optical axis 332*b* of optical component mount 320*b*.

The link block 360*b* further includes locking mechanisms 368*b*/370*b* and 372*b*/374*b* for securely locking the rails 310*b* and 310*c* to the link block 360*b*, respectively. The locking mechanisms comprise a countersink threaded holes 368*b* and 372*b* extending from a side wall of the housing 362*b* to the hole 364*b* and groove 366*b*, respectively. Further, in accordance with the exemplary embodiment, the locking mechanisms comprise lock screws 370*b* and 374*b* threaded into the countersink holes 368*b* and 372*b*, respectively. As discussed in more detail further herein, the tail ends of the locking screws 370*b* and 374*b* make contact with the flat surfaces 312*b* and 312*c* to urge the rails 310*b* and 310*c* against the respective internal walls of the hole 364*b* and groove 366*c* to effectuate the secure mounting of the link block 360*b* to the rails 310*b* and 310*c*, respectively.

Again, in a like manner, the link block 360*c* comprises a housing 362*c* including a rail mount 364*c* (e.g., a thru-hole) mechanically coupled to a portion of the rail 310*c*; the other portion of the rail 310*c* being mechanically coupled to the rail mount 324*c* of optical component mount 320*c*. The housing 362*c* of the link block 360*c* also includes another rail mount 366*c* (e.g., a groove) mechanically coupled to a portion of the rail 310*d*; another portion of the rail 310*d* being mechanically coupled to the rail mount 324*d* of the optical component mount 320*d*. In this configuration, the link block 360*c* effectively raises the height of the optical component mount 320*d* such that its optical axis 332*d* substantially aligns with the optical axis 332*c* of optical component mount 320*c*.

The link block 360*c* further includes locking mechanisms 368*c*/370*c* and 372*c*/374*c* for securely locking the rails 310*c* and 310*d* to the link block 360*c*, respectively. The locking mechanisms comprise a countersink threaded holes 368*c* and 372*c* extending from a side wall of the housing 362*c* to the hole 364*c* and groove 366*c*, respectively. Further, in accordance with the exemplary embodiment, the locking mechanisms comprise lock screws 370*c* and 374*c* threaded into the countersink holes 368*c* and 372*c*, respectively. As discussed in more detail further herein, the tail ends of the locking screws 370*c* and 374*c* make contact with the flat surfaces 312*c* and 312*d* to urge the rails 310*c* and 310*d* against the respective internal walls of the hole 364*c* and groove 366*c* to effectuate the secure mounting of the link block 360*c* to the rails 310*c* and 310*d*, respectively.

Although not shown in FIG. 3, the apparatus 300 may also include the base and telescopic assembly of apparatuses 100 and 200 for adjustment of the vertical position and angular orientation of the apparatus 300. A mounting post associated with the telescopic assembly may be inserted into a bottom hole of one of the optical component mounts 320*a*, 320*b*, 320*c*, and 320*d*, or one of the link blocks 360*a*, 360*b*, and 360*c*.

Figure 4A:
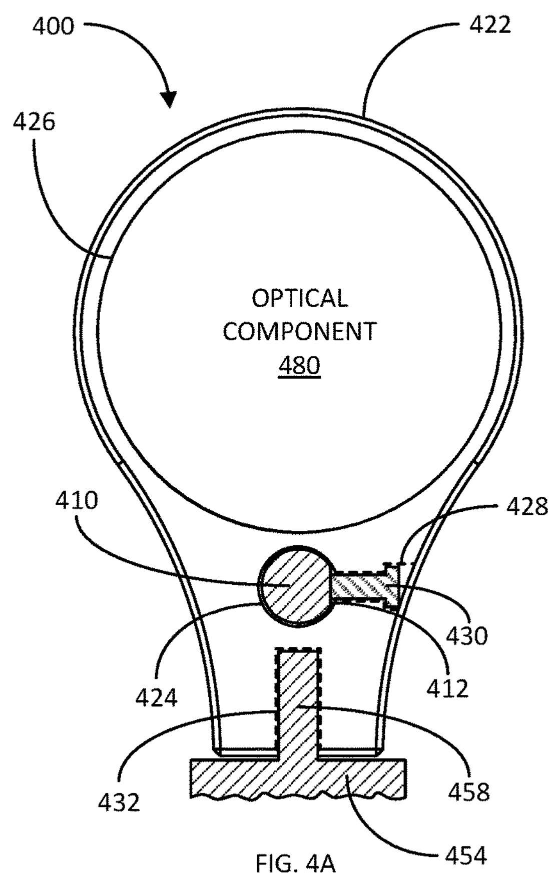
FIGS. 4A-4C illustrate front, side, and bottom views of an exemplary optical component mount in accordance with another aspect of the disclosure.
Figure 4B:
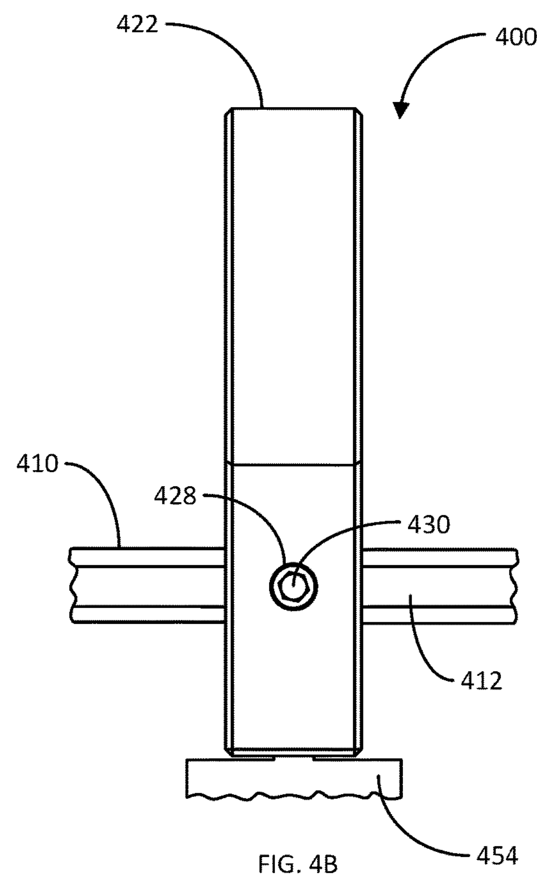
Figure 4C:
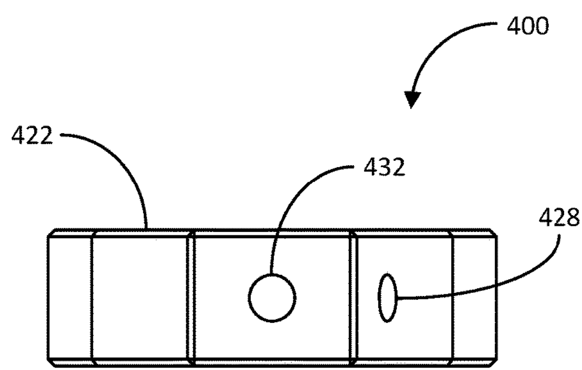
Figure 5A:
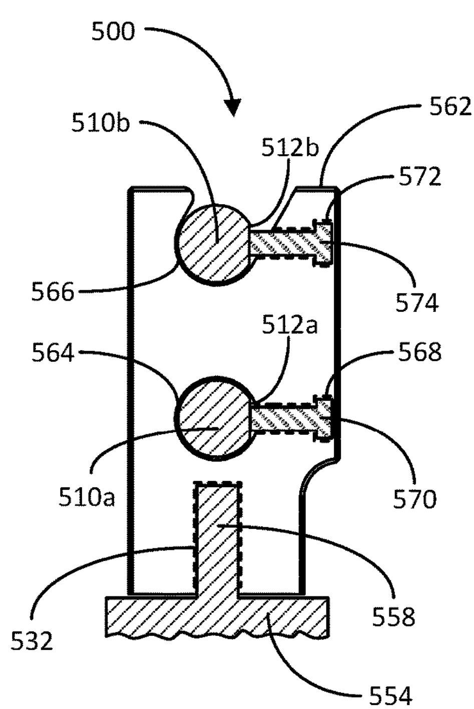
FIGS. 5A-5D illustrate front, side, bottom and perspective views of an exemplary link block in accordance with another aspect of the disclosure.
Figure 5B:
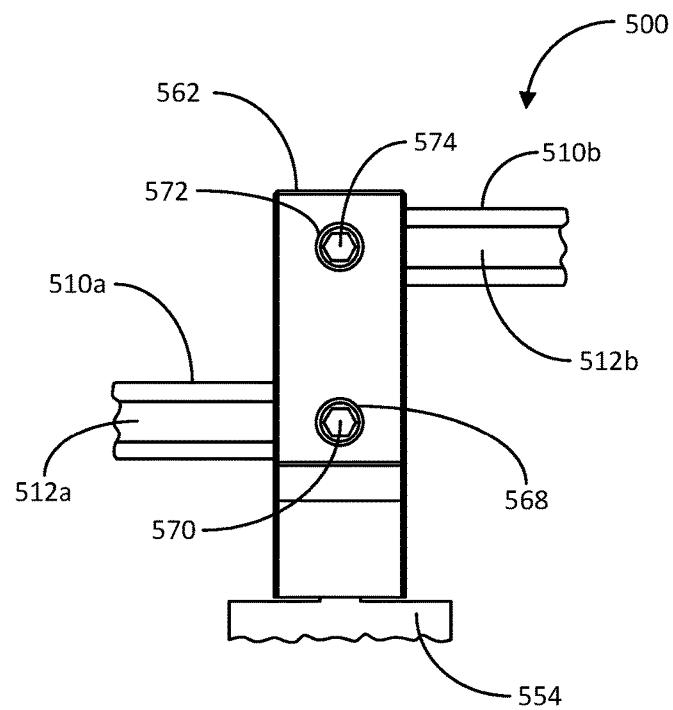
Figure 5C:
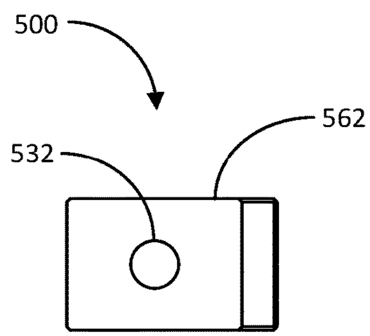
Figure 5D:
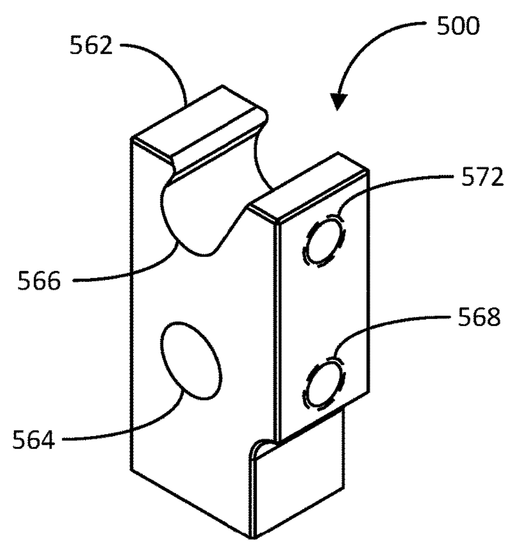

FIGS. 4A-4C illustrate front, side, and bottom views of an exemplary optical component mount 400 in accordance with another aspect of the disclosure. The optical component mount 400 comprises a housing 422 including a rail mount 424 (e.g., a thru-hole) for mechanically coupling to a portion of a rail 410. The optical component mount 400 further comprises a locking mechanism for securely locking the rail 410 onto the rail mount 424. In this regards, the locking mechanism comprises a countersink threaded hole 428 and a lock screw 430. The threaded hole 428 extends from a side wall of the housing 422 to the hole of the rail mount 424. The screw 430 includes a substantially flat end that makes contact to a flat surface 412 of the rail 410 to urge the rail against the internal wall of the hole 424 to secure the rail 410 to rail mount.

The housing 422 of the optical component mount 400 further includes an optical component dock 426 configured to securely and coaxially receive an optical component 480. As previously discussed, the optical component dock 426 may be configured as a threaded hole configured to thread with external threads around the perimeter of the disk-shaped optical component 480. As shown, the central longitudinal axis of the optical component mount 426 may substantially aligns with the optical axis of the optical component 480. Also, as illustrated, the longitudinal axis of the hole 424 and the rail 410 is substantially parallel to and horizontally aligned with the optical axis of the optical component 480.

The housing 422 of the optical component mount 400 further comprises a hole 432 extending vertically upward through the bottom side of the housing. The hole 432 is configured to receiving a mounting post 458 disposed on a telescopic mount 454 in order to adjust the vertical position and angular orientation of the optical component mount 400, as previously discussed with respect to the previous embodiments. The hole 432 may also be horizontally aligned with the rail hole 424 and the optical component dock 426. As shown, the optical component dock 426 is positioned vertically above the rail hole 410 which, in turn, is positioned vertically above the mounting hole 432.

FIGS. 5A-5D illustrate front, side, bottom and perspective views of an exemplary link block 500 in accordance with another aspect of the disclosure. The link block 500 comprises a housing 562 including a rail mount 564 (e.g., a thru-hole) for mechanically coupling to a portion of a rail 510*a*. The link block 500 further comprises a locking mechanism for securely locking the rail 510*a* onto the rail mount 564. In this regards, the locking mechanism comprises a countersink threaded hole 568 and a lock screw 570. The threaded hole 568 extends from a side wall of the housing 562 to the hole of the rail mount 564. The screw 570 includes a substantially flat end that makes contact to a flat surface 512*a* of the rail 510*a* to urge the rail 510*a* against the internal wall of the hole 564 to secure the rail 510*a* to the corresponding rail mount.

The housing 562 of the link block 500 further includes another rail mount 566 (e.g., a groove) for mechanically coupling to a portion of another rail 510*b*. The link block 500 further comprises a locking mechanism for securely locking the rail 510*b* onto the rail mount 566. In this regards, the locking mechanism comprises a countersink threaded hole 572 and a lock screw 574. The threaded hole 572 extends from a side wall of the housing 562 to the groove of the rail mount 566. The screw 574 includes a substantially flat end that makes contact to a flat surface 512*b* of the rail 510*b* to urge the rail 510*b* against the internal wall of the groove 566 to secure the rail 510*b* to the corresponding rail mount.

The housing 562 of the link block 500 further comprises a hole 532 extending vertically upward through the bottom side of the housing. The hole 532 is configured to receive a mounting post 558 disposed on a telescopic mount 554 in order to adjust the vertical position and angular orientation of the link block 500. The hole 532 may also be horizontally aligned with the rail hole 564 and rail groove 566. As shown, the rail groove 566 is positioned vertically above the rail hole 564 which, in turn, is positioned vertically above the mounting hole 532.

The rail hole 564 and rail groove 566 are configured to orient the longitudinal axes of the rails 510*a* and 510*b* substantial parallel with each other. Additionally, as previously discussed with apparatus 300, a first optical component mount may be mounted on rail 510*a* and a second optical component mount may be mounted on rail 510*b*. Also, as previously discussed with respect to apparatus 300, the first optical component mount may be configured to support an optical component having a larger diameter than one supported by the second optical component mount. Also, as previously discussed, because of the different configuration of the first and second optical component mounts, the link block 500 is configured to substantially align the optical axes of the first and second optical component mounts, the optical axes also being substantially parallel with the rails 510*a* and 510*b*.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus, comprising:

a first rail;

a second rail;

a first optical component mount comprising a first housing consisting of a first rail mount mechanically coupled to a first portion of the first rail for supporting the first optical component mount on the first rail, the first housing further comprising a first optical component dock configured to support a first optical component in a manner that defines a first optical axis, wherein the first rail mount and the first optical component dock are configured such that the first optical axis is substantially parallel with a first longitudinal axis of the first rail;

a second optical component mount comprising a second housing consisting of a second rail mount mechanically coupled to a first portion of the second rail for supporting the second optical component mount on the second rail, the second housing further comprising a second optical component dock configured to support a second optical component in a manner that defines a second optical axis, wherein the second rail mount and the second optical component dock are configured such that the second optical axis is substantially parallel with a second longitudinal axis of the second rail, and wherein the first and second longitudinal axes are substantially parallel and spaced apart from each other; and a link block comprising a third housing including a third rail mount mechanically coupled to a second portion of the first rail, and a fourth rail mount mechanically coupled to a second portion of the second rail, wherein the third and fourth rail mounts are configured to substantially align the second optical axis with the first optical axis.

2. The apparatus of claim 1, wherein the first optical component mount dock is configured as a first cylindrical hole, and the second optical component dock is configured as a second cylindrical hole through the second housing, wherein a first diameter of the first cylindrical hole is greater than a second diameter of the second cylindrical hole.

3. The apparatus of claim 1, wherein the third rail mount comprises a hole.

4. The apparatus of claim 1, wherein the fourth rail mount comprises a groove.

5. The apparatus of claim 1, wherein the link block further comprises:

a first locking mechanism for securely locking the first rail onto the third rail mount; and a second locking mechanism for securely locking the second rail onto the fourth rail mount.

6. The apparatus of claim 5, wherein the third rail mount comprises a hole formed within the third housing;

wherein the first locking mechanism comprises a first threaded screw positioned within a first threaded hole within the third housing, wherein an end of the first threaded screw is configured to urge the second portion of the first rail against the third housing within the hole to securely lock the first rail onto the third rail mount;

wherein the fourth rail mount comprises a groove formed within the third housing; and wherein the second locking mechanism comprises a second threaded screw positioned within a second threaded hole within the third housing, wherein an end of the second threaded screw is configured to urge the second portion of the second rail against the third housing within the groove to securely lock the second rail onto the fourth rail mount.

7. An apparatus, comprising:

a first rail;

a second rail;

a first optical component mount comprising a first housing including a first rail mount mechanically coupled to a first portion of the first rail for supporting the first optical component mount on the first rail, the first housing further comprising a first optical component dock configured to support a first optical component in a manner that defines a first optical axis;

a second optical component mount comprising a second housing consisting of a second rail mount mechanically coupled to a first portion of the second rail for supporting the second optical component mount on the second rail, the second housing further comprising a second optical component dock configured to support a second optical component in a manner that defines a second optical axis; and a first link block comprising a third housing including a third rail mount mechanically coupled to a second portion of the first rail, and a fourth rail mount mechanically coupled to a second portion of the second rail, wherein the third and fourth rail mounts are configured to substantially align the second optical axis with the first optical axis.

8. The apparatus of claim 7, wherein the first optical component mount dock is configured as a first cylindrical hole, and the second optical component dock is configured as a second cylindrical hole, wherein a first diameter of the first cylindrical hole is greater than a second diameter of the second cylindrical hole.

9. The apparatus of claim 7, wherein the third rail mount comprises a hole.

10. The apparatus of claim 7, wherein the fourth rail mount comprises a groove.

11. The apparatus of claim 7, wherein the first link block further comprises a locking mechanism for securely locking the first rail onto the third rail mount.

12. The apparatus of claim 11, wherein the third rail mount comprises a hole formed within the third housing;

wherein the locking mechanism comprises a threaded screw positioned within a threaded hole within the third housing, wherein an end of the threaded screw is configured to urge the second portion of the first rail against the third housing within the hole to securely lock the first rail onto the third rail mount.

13. The apparatus of claim 7, wherein the first link block further comprises a locking mechanism for securely locking the second rail onto the fourth rail mount.

14. The apparatus of claim 13, wherein the fourth rail mount comprises a groove formed within the third housing; and wherein the second locking mechanism comprises a threaded screw positioned within a threaded hole within the third housing, wherein an end of the threaded screw is configured to urge the second portion of the second rail against the third housing within the groove to securely lock the second rail onto the fourth rail mount.

15. The apparatus of claim 7, further comprising:

a third rail;

a third optical component mount comprising a fourth housing including a fifth rail mount mechanically coupled to a first portion of the third rail for supporting the third optical component mount on the third rail, the fourth housing further comprising a third optical component dock configured to support a third optical component in a manner that defines a third optical axis; and a second link block comprising a fifth housing including a sixth rail mount mechanically coupled to a third portion of the second rail, and a seventh rail mount mechanically coupled to a second portion of the third rail, wherein the sixth and seventh rail mounts are configured to substantially align the third optical axis with the second optical axis.

16. The apparatus of claim 15, further comprising:

a fourth rail;

a fourth optical component mount comprising a sixth housing including an eighth rail mount mechanically coupled to a first portion of the fourth rail for supporting the fourth optical component mount on the fourth rail, the sixth housing further comprising a fourth optical component dock configured to support a fourth optical component in a manner that defines a fourth optical axis; and a third link block comprising a seventh housing including a ninth rail mount mechanically coupled to a third portion of the third rail, and a tenth rail mount mechanically coupled to a second portion of the fourth rail, wherein the ninth and tenth rail mounts are configured to substantially align the fourth optical axis with the third optical axis.

17. The apparatus of claim 7, further comprising:

a base configured to be attached to an optical table;

a telescopic assembly comprising:

a bore mounted substantially vertical on the base; and a telescopic mount configured to slide vertically along and rotate angularly around a longitudinal axis of the bore, wherein the second optical component mount is supported by the telescopic mount; and a locking mechanism configured to lock the telescopic mount within the bore at a vertical position and angular orientation as desired by a user.

18. The apparatus of claim 17, wherein the second optical component includes a bottom side with a hole receiving a post extending upwards from the telescope mount.

19. The apparatus of claim 7, further comprising:

a base configured to be attached to an optical table;

a telescopic assembly comprising:

a bore mounted substantially vertical on the base; and a telescopic mount configured to slide vertically along and rotate angularly around a longitudinal axis of the bore, wherein the first link block is supported by the telescopic mount; and a locking mechanism configured to lock the telescopic mount within the bore at a vertical position and angular orientation as desired by a user.

20. The apparatus of claim 19, wherein the third housing of the first link block includes a bottom side with a hole receiving a post extending upwards from the telescope mount.

* * * * *